United States Patent
Zelezniak et al.

(10) Patent No.: US 12,513,092 B2
(45) Date of Patent: Dec. 30, 2025

(54) UNINTERRUPTED TRANSFER OF CARRIERS BETWEEN BASEBAND UNIT SERVER RESOURCES

(71) Applicant: AT&T Intellectual Property I, L.P., Atlanta, GA (US)

(72) Inventors: Aleksandr Zelezniak, Morganville, NJ (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 693 days.

(21) Appl. No.: 17/823,350

(22) Filed: Aug. 30, 2022

(65) Prior Publication Data
US 2024/0073153 A1 Feb. 29, 2024

(51) Int. Cl.
*H04W 28/08* (2023.01)
*H04L 47/125* (2022.01)
(Continued)

(52) U.S. Cl.
CPC ............ *H04L 47/72* (2013.01); *H04L 47/125* (2013.01); *H04W 28/086* (2023.05); *H04W 72/52* (2023.01); *H04W 72/0453* (2013.01)

(58) Field of Classification Search
CPC ..... H04W 72/04; H04W 36/08; H04W 60/06; H04W 72/52; H04W 48/18;
(Continued)

(56) References Cited

U.S. PATENT DOCUMENTS 10,064,099 B1 * 8/2018 Raina ................... H04W 24/02
11,095,559 B1 8/2021 Garvia et al.
(Continued)

FOREIGN PATENT DOCUMENTS

EP  3618518     3/2020
EP  3 879 886 A1  9/2021
(Continued)

OTHER PUBLICATIONS

Non-Final Office Action received for U.S. Appl. No. 17/104,458 dated Mar. 21, 2022, 43 pages.
Jung, et al., "Pooling of Baseband Units in Fifth Generation Networks and Beyond", U.S. Appl. No. 17/653,545, filed Mar. 4, 2022, 44 pages.
Zelezniak, et al., "Sharing of Baseband Units in Fifth Generation Networks and Beyond", U.S. Appl. No. 17/681,511, filed Feb. 25, 2022, 43 pages.
(Continued)

*Primary Examiner* — Tu X Nguyen
(74) *Attorney, Agent, or Firm* — Guntin & Gust, PLC; Mark Wilinski

(57) ABSTRACT

Described is allocating and deallocating server instances (e.g., comprising baseband unit resources) of a distributed unit based on need for user equipment session handling. For example, when user equipment sessions load a server instance to a threshold capacity, an additional server instance can be allocated to handle new user equipment sessions. Any selected carrier subgroup, which can correspond to a cell's carriers, can be selected for assigning any newly incoming, unassigned user equipment sessions associated with the selected carrier subgroup to the newly allocated, additional server instance. As prior sessions end, the load decreases on the server that had reached the threshold capacity. When the total hub load decreases, deallocation of a no-longer used server instance can be performed. Deallocation can include transferring any remaining session, e.g., long-lasting sessions, to a different server instance. Load balancing and/or resource consolidation, without service interruption, is thus achievable within a hub.

20 Claims, 11 Drawing Sheets

(51) Int. Cl.
*H04L 47/72* (2022.01)
*H04W 28/086* (2023.01)
*H04W 72/52* (2023.01)
*H04W 72/0453* (2023.01)

(58) Field of Classification Search
CPC ... H04W 52/343; H04W 72/00; H04W 74/04; H04W 16/08; H04W 16/12; H04W 28/08; H04W 40/04
See application file for complete search history.

(56) References Cited

U.S. PATENT DOCUMENTS

| | | | |
|---|---|---|---|
| 11,304,109 B1 | 4/2022 | Potharaju et al. | |
| 11,606,409 B1* | 3/2023 | Ergen | H04L 65/612 |
| 2014/0098666 A1* | 4/2014 | Frank | H04L 47/10 |
| | | | 370/230 |
| 2018/0270869 A1 | 9/2018 | Tsai | |
| 2020/0107307 A1 | 4/2020 | Nammi et al. | |
| 2020/0145154 A1 | 5/2020 | Black et al. | |
| 2020/0196220 A1 | 6/2020 | Centonza et al. | |
| 2020/0274656 A1 | 8/2020 | Gordaychik | |
| 2020/0351955 A1 | 11/2020 | Jeon et al. | |
| 2022/0159510 A1 | 5/2022 | Jang et al. | |
| 2022/0167418 A1 | 5/2022 | Zelezniak et al. | |

FOREIGN PATENT DOCUMENTS

| | | |
|---|---|---|
| WO | 2020096860 | 5/2020 |
| WO | 2020144637 | 7/2020 |
| WO | 2021135416 | 7/2021 |
| WO | 2022087603 | 4/2022 |

OTHER PUBLICATIONS

Zelezniak, et al., "Baseband Unit Pooling Using Shared Scheduler", U.S. Appl. No. 17/809,363, filed Jun. 28, 2022, 42 pages.
Notice of Allowance received for U.S. Appl. No. 17/098,619 dated Oct. 18, 2022.
Notice of Allowance received for U.S. Appl. No. 17/104,458 dated Aug. 10, 2022, 39 pages.
Notice of Allowance received for U.S. Appl. No. 17/104,458 dated Sep. 1, 2022, 17 pages.
Notice of Allowance received for U.S. Appl. No. 17/104,458 dated Nov. 23, 2022, 16 pages.

* cited by examiner

UNINTERRUPTED TRANSFER OF CARRIERS BETWEEN BASEBAND UNIT SERVER RESOURCES

TECHNICAL FIELD

The subject application relates to wireless communications systems for advanced networks in general, and, for example, to wireless communications systems for New Radio (NR) networks, including fifth generation (5G) cellular wireless communications systems and/or other next generation networks.

BACKGROUND

In fifth generation (5G) cellular wireless communications systems, the cost-of-service deployment is significantly increased relative to prior systems in part because 5G uses higher frequencies than the currently wide-deployed wireless technologies such as long term evolution (LTE). The signals using these frequencies allow the network service providers to offer faster speeds and reduced data access latency to its customers compared to any previous generation technologies. However, the higher frequency signals travel considerably shorter distances, dissipate much easier, and penetrate obstacles far less than do the signals of the previous generation technologies do.

As a result, to provide the same service coverage, 5G service needs a far-denser deployment than other existing wireless technologies. Offering 5G services thus presents a substantial burden on service providers in terms of capital and operational cost. A significant portion of the deployment cost results from the cost of the baseband units that communicate data between radio access network nodes and the core network, which are statically mapped to cellular radio units. Moreover, once deployed, such baseband units contribute to the overall operational cost, including energy consumption.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
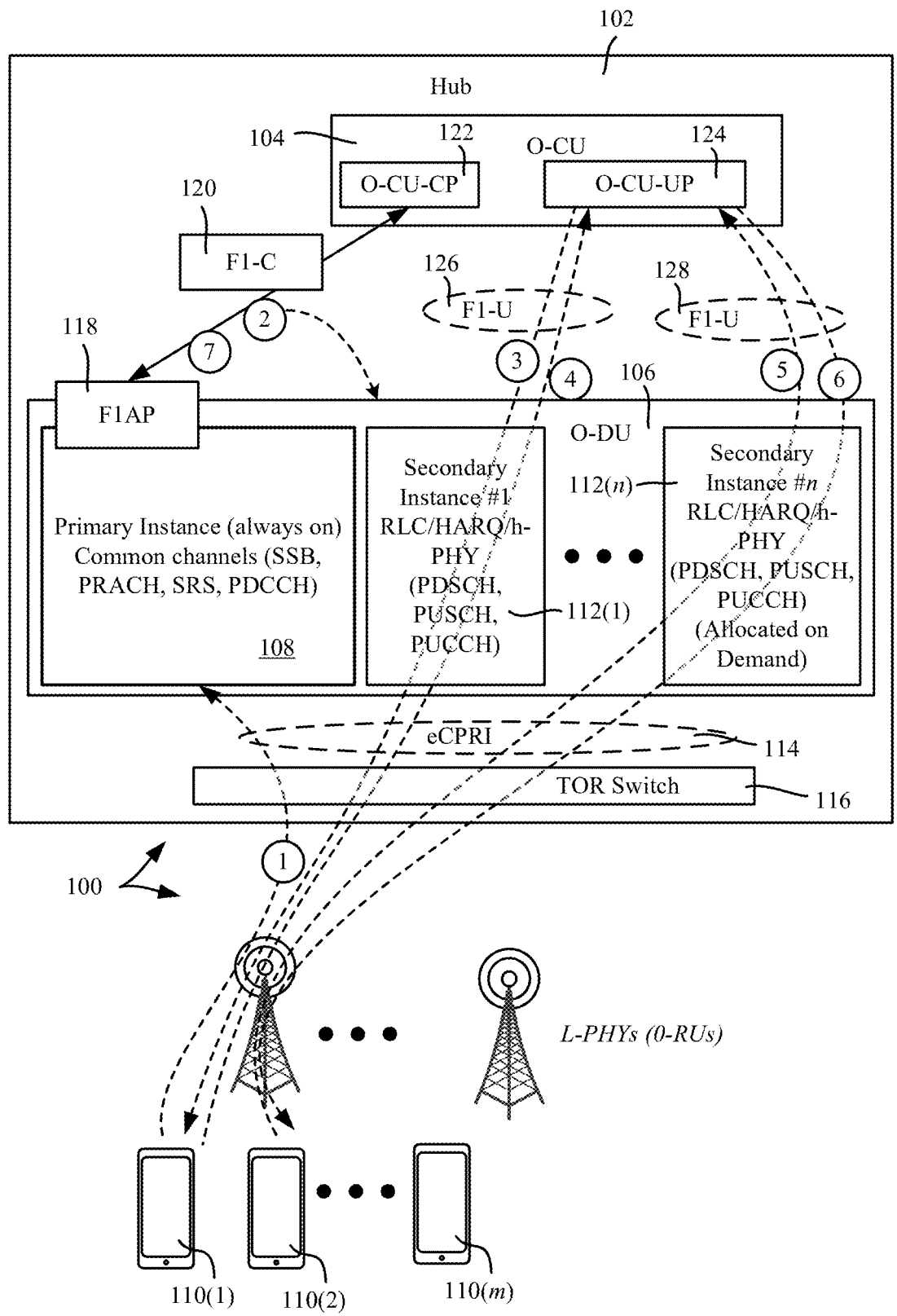
FIG. 1 is a block and dataflow diagram illustrating an example network communication system in which a hub contains a centralized unit and distributed unit components including distributed unit components allocated and deallocated on demand, in accordance with various aspects and embodiments of the subject disclosure.

The technology described herein is generally directed towards allocating and deallocating server resources, e.g., comprising baseband units (BBUs), based on the need for the server resources. As will be understood, this facilitates load balancing and/or consolidation.

Server resources can be located in a centralized location (a hub) and can serve multiple carriers of sites (cells/sectors). When current server resources reach a capacity limit with respect to handling the load of user sessions, one or more carriers, which can be of a cell, are selected, and newly incoming (not yet assigned) user equipment sessions of those selected one or more carriers are assigned to other server resources; the other server resources can be allocated as needed. When the load decreases, newly incoming (not yet assigned) user equipment sessions associated with an existing server's one or more carriers can be assigned to back different server(s), whereby a server with no remaining user equipment sessions can be deallocated.

As will be understood, the technology described herein facilitates deploying baseband units in a cost-efficient way by meeting the actual demand of the network service. This is in contrast to current deployment models in which the service providers need to deploy baseband units at each of the service areas even when the demand is very low, which results in significant investment for unnecessary and underutilized baseband units at the initial stage of deployment; (indeed, many baseband units may be idle due to overprovisioning or low demand and thus do nothing but waste electricity).

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNodeB (gNB)," "evolved Node B (eNodeB)," "home NodeB (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a hub 102 (e.g., centralized hub) comprises a centralized unit 104 (O-CU) and a distributed unit 106 (O-DU), (where "O" refers to "Open" from the Open Radio Access Network (O-RAN) part of O-RAN). The distributed unit 106 includes an always-on primary instance 108 (generally always on components/functions) for common channels including SSB (synchronization signal block), PRACH (physical random access channel for initial access requests from user equipment, SRS (sounding reference signal) and PDCCH (physical downlink control channel) 108 that allow user equipment 110(1)-110(m) to connect to the network.

The distributed unit 106 also includes one or more allocated-on demand user plane secondary instances (nodes) 112(1)-112(n) comprising server resources (e.g., corresponding to baseband units (BBUs)) as described herein. Note that if there is no actual demand (no currently active user equipment (UE) sessions), there may not be any active allocated-on demand user plane node secondary instances, although it is feasible in times of no demand to have one or more active user plane secondary instances in anticipation of demand.

As represented in FIG. 1 by the dashed arrow labeled with circled numeral one (1), PRACH and SRS eCPRI (enhanced Common Public Radio Interface, dashed ellipse 114) frames from a user equipment 110(1) (e.g., of a user equipment session) are delivered via a switch 116 (e.g., top-of-rack, or ToR switch) to the always on primary distributed unit (O-DU) instance 108. This is communicated via the F1AP (F1 application protocol) interface 118 and F1-C (F1 control plane) interface 120 to the centralized unit control plane component/functionality 122 of the centralized unit 104.

As also represented in FIG. 1 by the dashed arrow labeled with the circled numeral two (2), a secondary instance (e.g., 112(1) is assigned to communicate (e.g., handle) the user plane traffic of the user equipment user equipment 110(1). Note that the secondary instance 112(1) can be allocated as needed, but in general, at least one secondary instance is already available for user equipment sessions.

The secondary O-DU instance 112(1) records its identifier (e.g., in the DU Port ID field of the eCPRI frame) during downlink transmission from the centralized unit control plane component/functionality 124 via the F1 user plane (F1-U) interface 126, as represented in FIG. 1 by the dashed arrow labeled with the circled numeral three (3). On uplink communications, the eCPRI frames are directed to the secondary O-DU instance 112(1) from where the prior message came based on the same secondary O-DU instance identifier (e.g., in the DU Port ID field), via the logic in the ToR switch 116), as represented in FIG. 1 by the dashed arrow labeled with the circled numeral four (4).

As more and more user equipment sessions arrive, the capacity of the secondary O-DU instance 112(1) approaches and reaches a defined capacity data limit which triggers reassignment of new user equipment sessions; e.g., eighty percent can be set as an upper capacity triggering criterion. When this occurs, one or more carriers are selected, and new user equipment sessions for the selected carrier(s) are assigned to a next secondary instance that has available capacity. If no such next secondary instance exists, a new secondary instance is allocated. Note that in general it takes some finite time (which can be on the order of seconds) before a newly allocated secondary instance is ready (that is, "up and running") to handle user equipment session traffic, and thus the upper capacity limit is defined (e.g., via statistics or the like) so that the existing secondary instance(s) are able to handle new user equipment sessions for at least that finite time, e.g., reasonably before reaching one-hundred percent capacity. In the example of FIG. 1, the user equipment 110(2) is thus assigned to the secondary instance 112(n) as represented by the dashed arrows labeled with the circled numerals five ((5) uplink) and six ((6) downlink). Again, the secondary O-DU instance identifier properly directs the new user equipment session traffic via an F1 user plane (F1-U) interface 128 and the switch 116.

Note that it is feasible to statistically predict a need for additional server resources, and allocate such resources before the upper capacity triggering criterion is satisfied. For example, if it is known from measured hub load data that the number of needed server resources tends to increase during the day and decrease at night, then an appropriate number of servers can be allocated and ready to handle user traffic before an actual need/deallocated as no longer needed. It is also feasible to vary (e.g., reduce) the upper capacity triggering criterion based on estimated/predicted load to generally obtain the same "ready-in-advance" result. Note that if the prediction is incorrect, and, for example, the total hub load increases faster than anticipated, the upper capacity triggering criterion can still be used to reassign user equipment sessions, with additional server resource allocation as needed.

Figure 2:
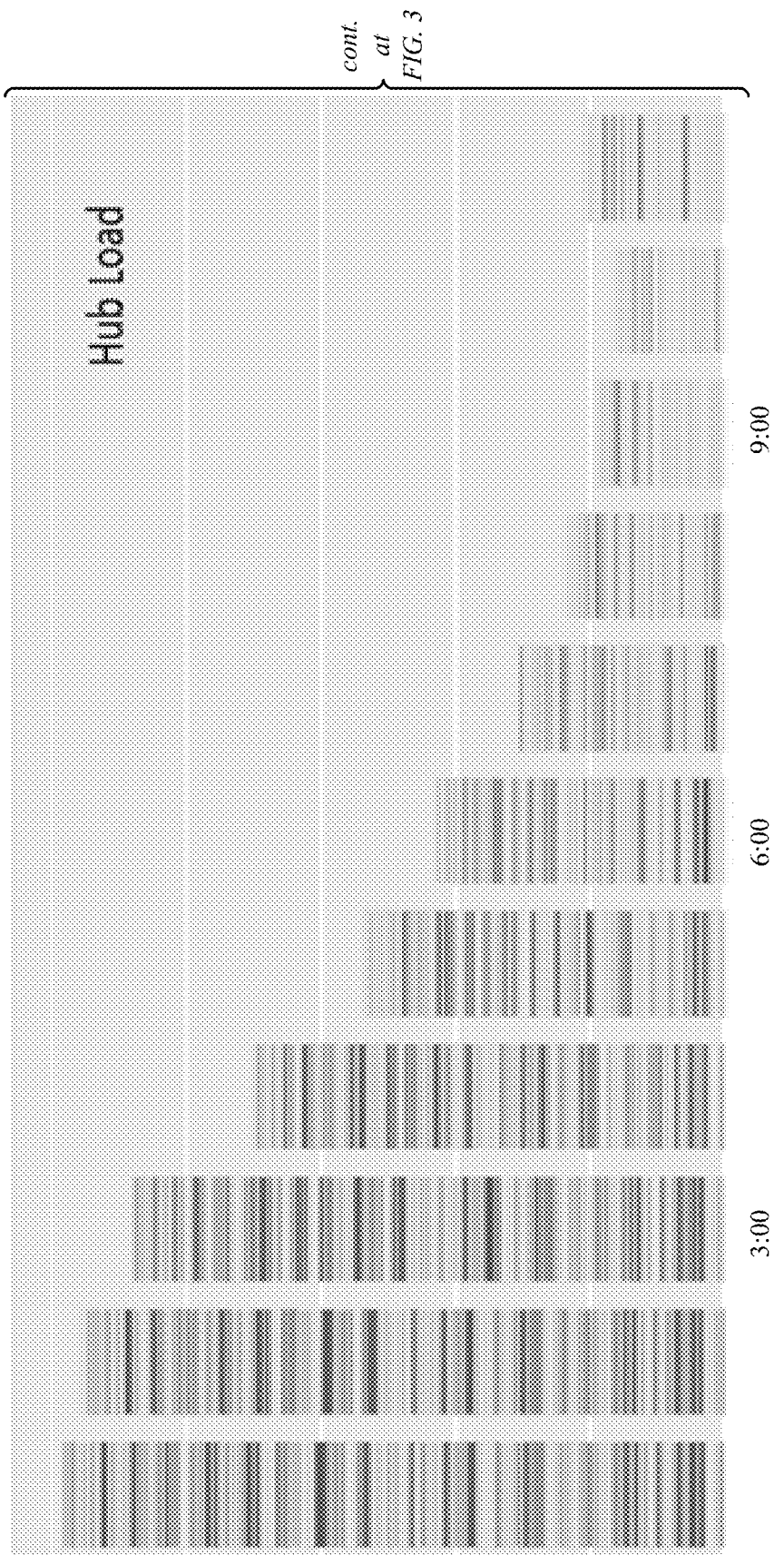
FIGS. 2 and 3 are example graphical representations of a hub load with respect to user equipment sessions, in accordance with various aspects and embodiments of the subject disclosure.
Figure 3:
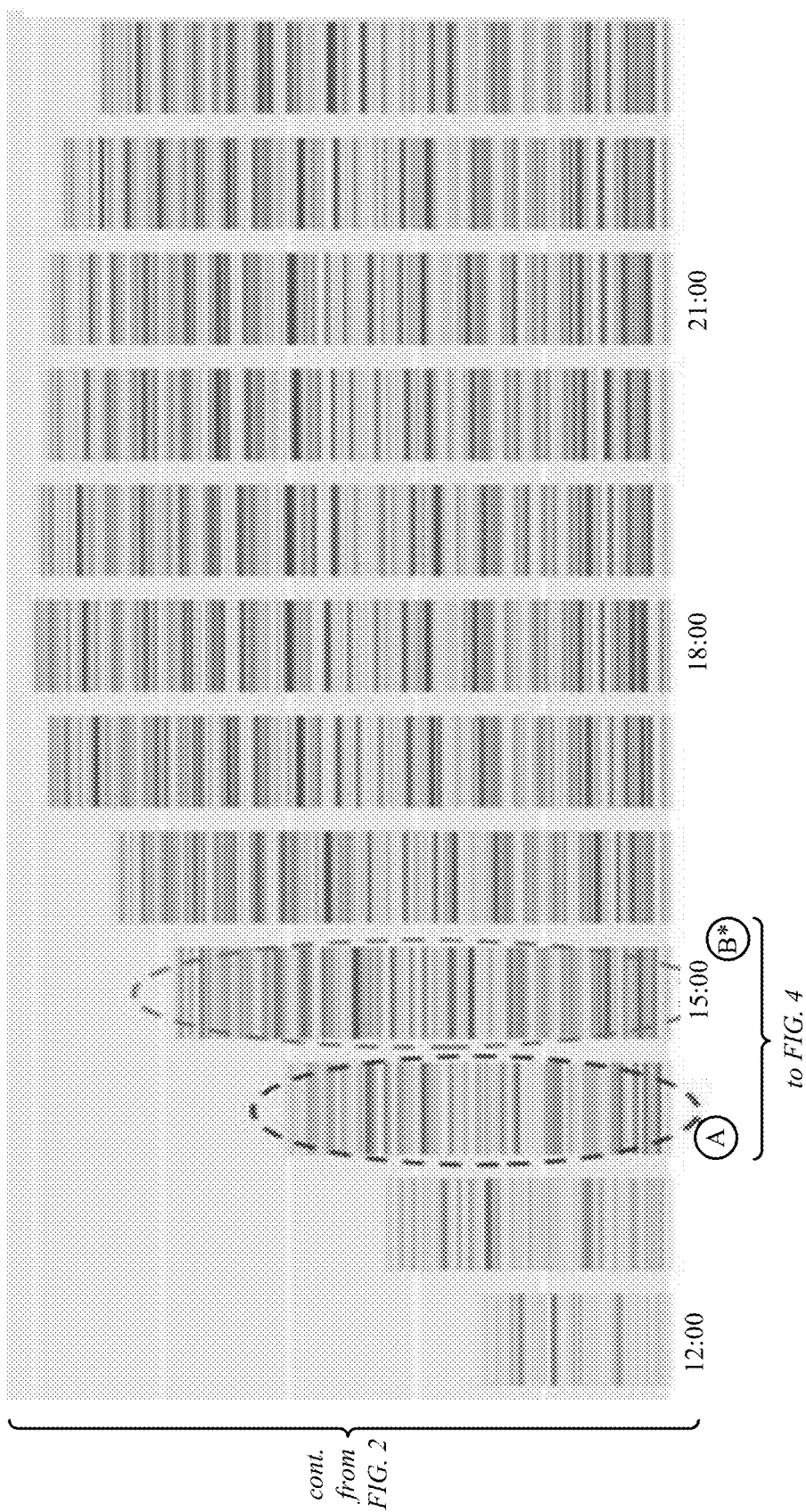
Figure 4:
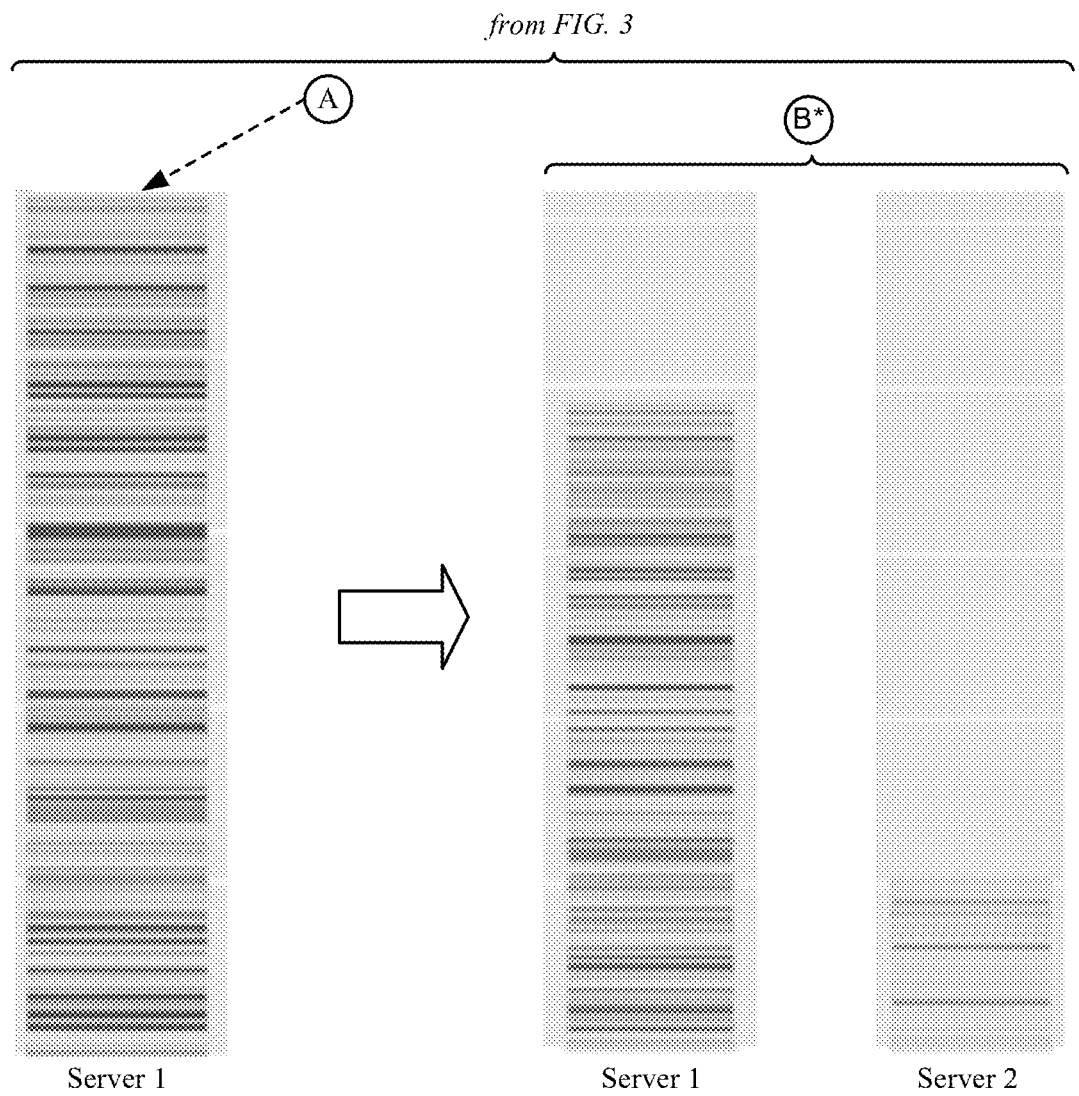
FIG. 4 is an example graphical representation of redistributing a hub load by reassigning carriers for newly incoming user equipment sessions, in accordance with various aspects and embodiments of the subject disclosure.

FIGS. 2 and 3, in which the differently shaded lines represent different cell identifiers, show how total hub load can change over time. As shown in FIG. 4, without new user equipment session reassignment, a server's (e.g., server 1) load will eventually reach the server's capacity, as shown in FIG. 4 via the dashed oval with circled label A for server 1. In contrast, with the technology described herein, with new user equipment session reassignment, when the server's (e.g., server 1) load approaches the threshold capacity, a subgroup of one or more carriers are assigned to a new server, one with available capacity (e.g., server 2, with the dashed oval in FIG. 3 with circled label B* corresponding to the server 1 and server 2 loads in FIG. 4). Significantly, this reassignment occurs without service interruption to any existing or new user equipment session, even though mobile communication timing constraints are very severe; (e.g., the transmission time interval (TTI) for 5G can be as low as 62.5 microseconds). Note that the subgroup selected can be one carrier or any larger subset of the total group of carriers, which, for example, can correspond to the carrier(s) of an entire cell.

Further, to save computing resources (and therefore operating costs), when the total load decreases, any new sessions can be reassigned such that a fewer number of servers (DU instance) are needed. In the event that a slightly used server, which can almost otherwise be deallocated, has a long lasting remaining anomalous session (or some defined, e.g., small, number of remaining sessions, such remaining session(s) can be migrated to a different instance of server resources to deallocate the slightly used server without service interruption, e.g., via a session modification request. For example, as shown in FIG. 1 via the circled numeral seven (7), an F1-C "UE Context Modification Required" message from O-DU 106 to O-CU 104 can be used to reassign long-lasting sessions, which will invoke a new "UE Context setup request" from O-CU 104 as described with reference to circled numeral two (2). Note that a session modification request or the like can be done for other reasons, e.g., scheduled maintenance and so on.

Figure 5:
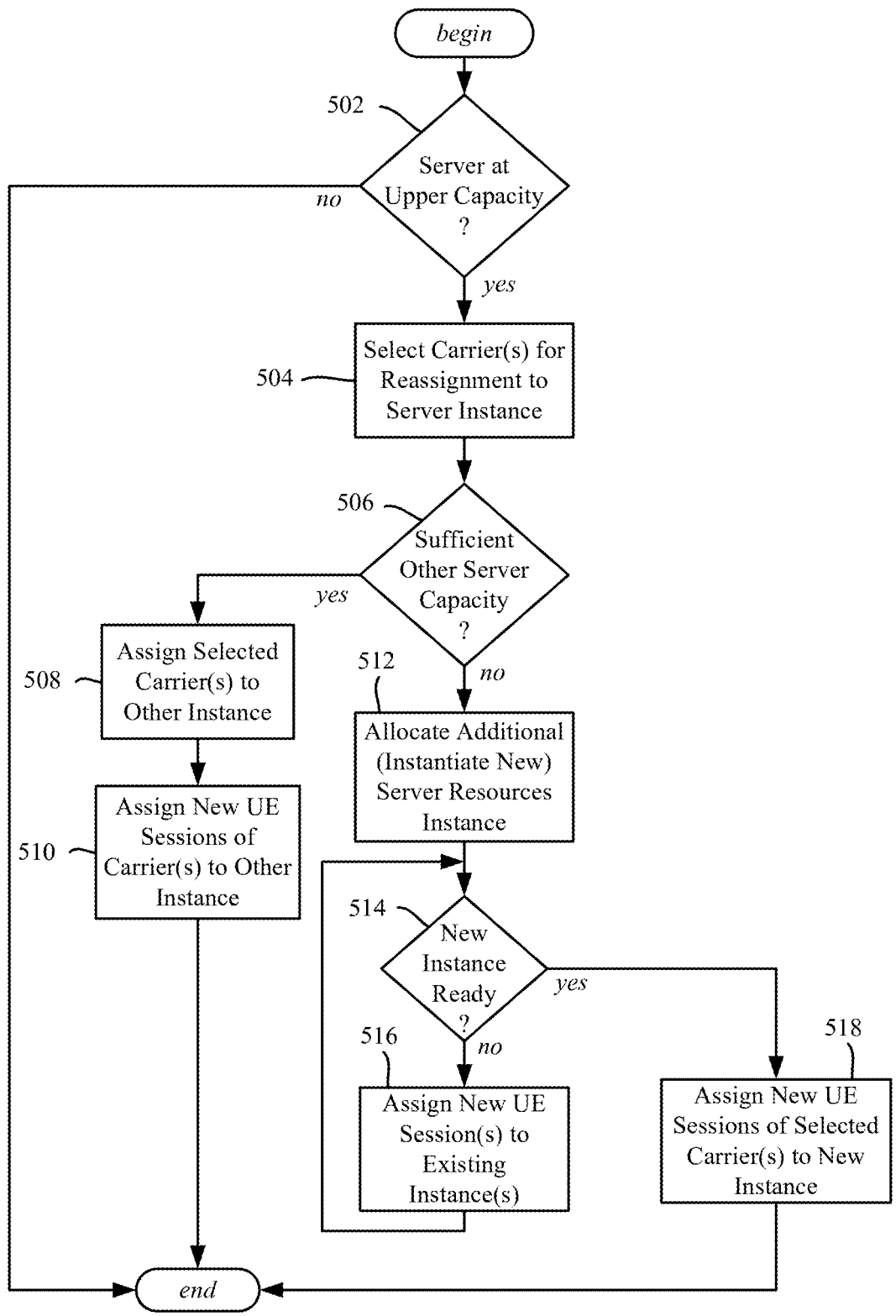
FIG. 5 is a flow diagram illustrating example operations related to allocating a server instance for new user equipment sessions of selected carrier(s), in accordance with various aspects and embodiments of the subject disclosure.

FIG. 5 shows some example logic/operations related to reassigning carriers for newly incoming user sessions to secondary server resources (DU instances) upon detection of a secondary server/DU instance capacity data reaching a defined upper capacity limit/criterion. If not reached, the logic/operations can end, with the example operations of FIG. 5 repeated as appropriate, e.g., periodically, more frequently as hub load increases, more frequently based on estimated load, as triggered by a server, and/or the like.

If instead at operation 502 a server (secondary server resources) instance has reached its threshold upper capacity criterion, e.g., some defined percentage below one-hundred percent, operation 502 branches to operation 504 to select one or more carriers for assigning user equipment sessions to at least one different set of server resources/DU instances. The selected carriers can correspond to a cell, and any appropriate selection mechanism can be used, e.g., a least loaded cell that comprises the selected carrier(s), a most loaded cell that comprises the selected carrier(s), a least number of existing user equipment sessions associated with the selected carrier(s), a greatest number of the existing user equipment sessions associated with the selected carrier(s), a random selection, a round robin selection, and so on.

If, as evaluated at operation 506, sufficient other server instance(s) have capacity for the newly incoming user session(s), then the selected carrier subgroup (one or more selected carriers) are assigned to the other server instance or instances at operation 508. As a result, via operation 510, any newly incoming user equipment sessions associated with the selected carrier subgroup are assigned to and will be handled by the other server instance or instances. In this way, the load of user equipment sessions will tend to decrease on the server instance that is approaching capacity as prior, existing user sessions of the selected carrier subgroup end over time, while the new, incoming user equipment sessions assigned to the selected carrier subgroup end over will tend to increase the load on the other server instance(s).

Returning to operation 506, if the other server instance(s), if any, do not have capacity for handling newly incoming user equipment sessions, at operation 512 an additional (newly instantiated) instance of server resources is allocated for the selected carrier subgroup. As set forth herein, the new instance may not be immediately ready, and until ready, operation 514 branches to operation 516 to continue to assign any unassigned (newly incoming) user equipment sessions associated with the selected carrier subgroup to the existing server instance(s) based on their prior carrier (or cell) to server instance mapping. Once the newly instantiated instance ready, e.g., responds appropriately to the system, any unassigned (newly incoming) user equipment sessions associated with the selected carrier subgroup are assigned to the newly instantiated server resources instance.

Figure 6:
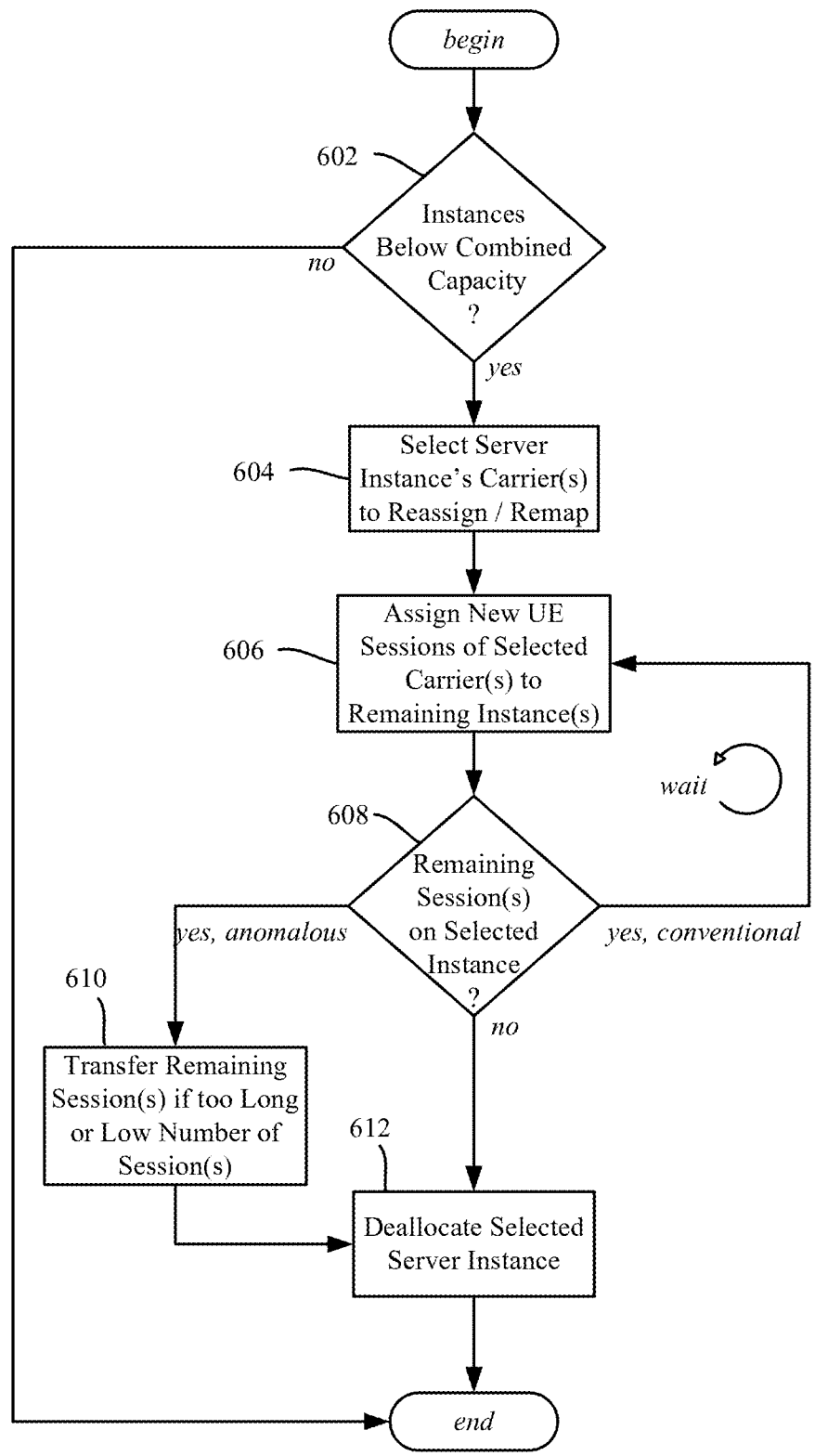
FIG. 6 is a flow diagram illustrating example operations related to deallocating a server instance, in accordance with various aspects and embodiments of the subject disclosure.

As readily apparent from FIGS. 2 and 3, the hub load can decrease over time, whereby less server resources are needed, whereby at least one server instance can be deallocated. To this end, if a server instances is (or the combined instances are) below a lower capacity limit, then less server instances are needed. If hub load is low, a server can be selected to reassign its remaining carrier(s) to one or more other server instances, as represented by operation 602 branching to operation 604. Any server selection criterion can be used, such as to deallocate a full set of one or more server instances of a physical computing device for power saving, maintenance, upgrading, replacement and so on. Note that it is feasible to select multiple server instances for reassigning their carriers, however FIG. 6 shows a single instance selected at a time; for a single instance at a time, the operations of FIG. 6 can be repeated until a desired number of server instance(s) remain.

Operation 606 assigns newly incoming user equipment sessions associated with the migrated carriers to the selected server instance. As a result, the selected server instance (to be deallocated) will eventually not have any user equipment sessions; operations 608 and 612 can thus perform the deallocation in most scenarios. However, it is possible that one or more user equipment sessions are too long, e.g., exceeding a time limit. In such a scenario, as little as one long-lasting user session can otherwise prevent a server instance from being deallocated so as to not interrupt service to user equipment. As such, as set forth herein, via operation 610, any long-lasting remaining user session(s), and/or small (defined) number of remaining user equipment sessions can transferred to a different server instance, such that once transferred, no user equipment sessions remain for the server instance, and deallocation of that server instance at operation 612 can proceed.

Figure 7:
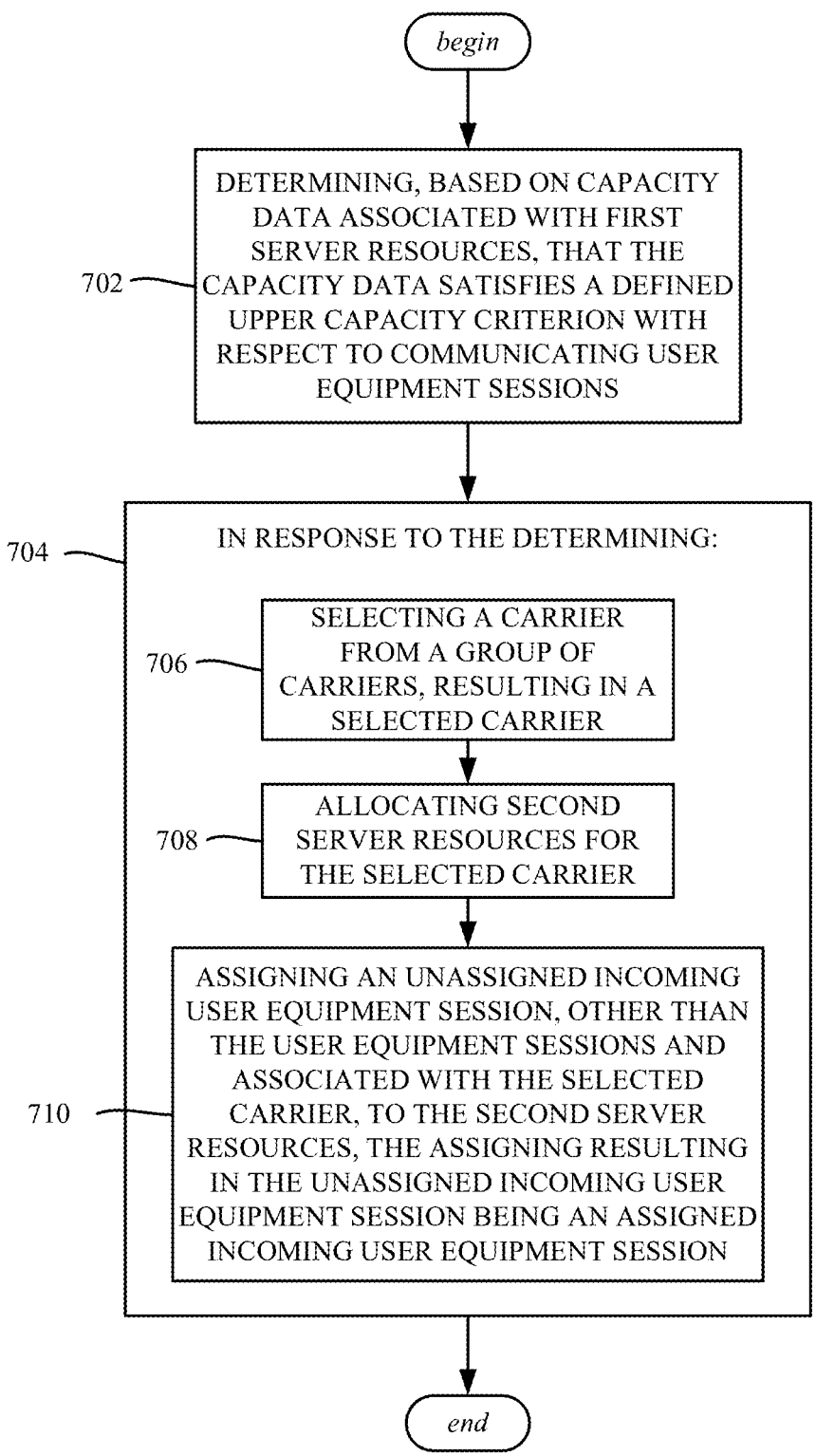
FIG. 7 illustrates example operations related to allocating second server resources based on capacity data and capacity criterion of first server resources, in accordance with various aspects and embodiments of the subject disclosure.

One or more example aspects are represented in FIG. 7, and can correspond to a system, comprising a processor, and a memory that stores executable instructions that, when executed by the processor of the system, facilitate performance of operations. Example operation 702 represents determining, based on capacity data associated with first server resources, that the capacity data satisfies a defined upper capacity criterion with respect to communicating user equipment sessions. Example operation 704 represents, in response to the determining, selecting a carrier from a group of carriers, resulting in a selected carrier (example operation 706), allocating second server resources for the selected carrier (example operation 708), and assigning an unassigned incoming user equipment session, other than the user equipment sessions and associated with the selected carrier, to the second server resources, the assigning resulting in the unassigned incoming user equipment session being an assigned incoming user equipment session (example operation 710).

The capacity data associated with the first server resources can include first capacity data, the selected carrier can be a first selected carrier, wherein the unassigned incoming equipment user session is a first unassigned incoming equipment user session, and further operations can include determining, based on second capacity data associated with the second server resources, that the second capacity data satisfies a second defined upper capacity criterion with respect to communicating user equipment sessions via the second server resources, in response to the determining that the second capacity data satisfies the second defined capacity criterion, allocating third server resources for a second selected carrier of the group of carriers, and assigning a second unassigned incoming equipment user session associated with the third selected carrier to the third server resources.

The selected carrier of the group of carriers can include a first selected carrier of a subgroup of the group of carriers, the unassigned incoming equipment user session can be a first new incoming equipment user session, and further operations can include selecting a second selected carrier of the subgroup of carriers, and assigning a second unassigned incoming equipment user session associated with the second selected carrier to the second server resources. The subgroup of the group of carriers can correspond to a single cell site.

Further operations can include determining that the first server resources are no longer communicating any of the user equipment sessions, and, in response to the determining that the first server resources are no longer communicating any of the user equipment sessions, deallocating the first server resources.

Further operations can include determining that the first server resources are communicating a number of remaining user equipment sessions of the user equipment sessions, and, in response to the determining that the first server resources are communicating the number of remaining user equipment sessions, migrating the number of remaining user equipment sessions to the second server resources, and deallocating the first server resources.

Further operations can include determining that the first server resources are communicating a remaining user equipment session of the user equipment sessions for a length of time that satisfies a defined length of time criterion, and, in response to the determining, migrating the remaining user equipment session to the second server resources, and deallocating the first server resources.

Selecting the selected carrier can include at least one of: determining the selected carrier based on a least loaded cell that comprises the selected carrier, determining the selected carrier based on most loaded cell that comprises the selected carrier, determining the selected carrier based on a least number of existing user equipment sessions associated with the selected carrier or a greatest number of the existing user equipment sessions associated with the selected carrier, determining the selected carrier based on a random selection, or determining the selected carrier based on a round robin selection.

Allocating the second server resources for the selected carrier can correspond to a distributed unit instance assignment, and wherein the distributed unit instance assignment can be performed by a centralized unit control plane function.

Allocating the second server resources for the selected carrier can correspond to a distributed unit instance assignment, and the distributed unit instance assignment can be performed by a function of an F1 interface application protocol handler coupled to a distributed unit.

The first server resources can correspond to a baseband unit instance.

Allocating the second server resources for the selected carrier can correspond to a distributed unit instance assignment of a distributed unit instance, and further operations can include recording an identifier of the distributed unit instance as part of a downlink transmission to the unassigned user equipment session, receiving an uplink transmission from the unassigned user equipment session, the uplink transmission comprising the identifier of the distributed unit instance, and directing the uplink transmission to the distributed unit instance based on the identifier of the distributed unit instance.

Further operations can include determining, prior to assigning the unassigned incoming equipment user session, that the second server resources have available capacity to handle the unassigned incoming user equipment session.

Figure 8:
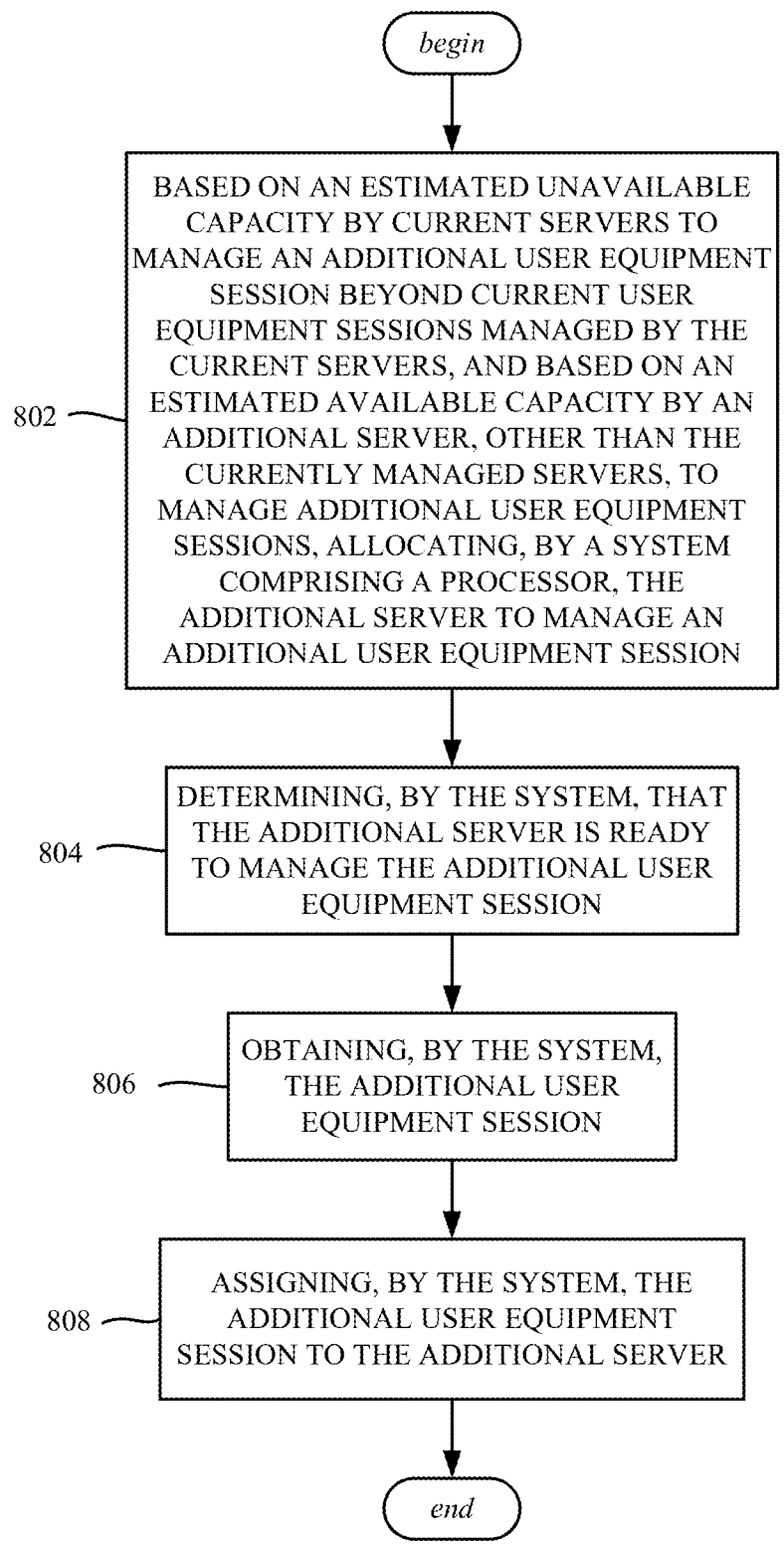
FIG. 8 illustrates example operations related to allocating additional server resources based on estimated availability of current servers for managing user equipment sessions, in accordance with various aspects and embodiments of the subject disclosure.

One or more example aspects are represented in FIG. 8, and can correspond to example operations, e.g., of a method. Operation 802 represents, based on an estimated unavailable capacity by current servers to manage an additional user equipment session beyond current user equipment sessions managed by the current servers, and based on an estimated available capacity by an additional server, other than the currently managed servers, to manage additional user equipment sessions, allocating, by a system comprising a processor, the additional server to manage an additional user equipment session. Operation 804 represents determining, by the system, that the additional server is ready to manage the additional user equipment session. Operation 806 represents obtaining, by the system, the additional user equipment session. Operation 808 represents assigning, by the system, the additional user equipment session to the additional server.

Allocating the additional server can include predicting the estimated unavailable capacity by the current servers based on historical load data.

Allocating the additional server based on the estimated available capacity by the additional server can include determining that current server capacity of the current servers satisfies a defined capacity criterion.

Further operations can include deallocating, by the system, a current server of the current servers that is no longer managing any of the current user equipment sessions.

Figure 9:
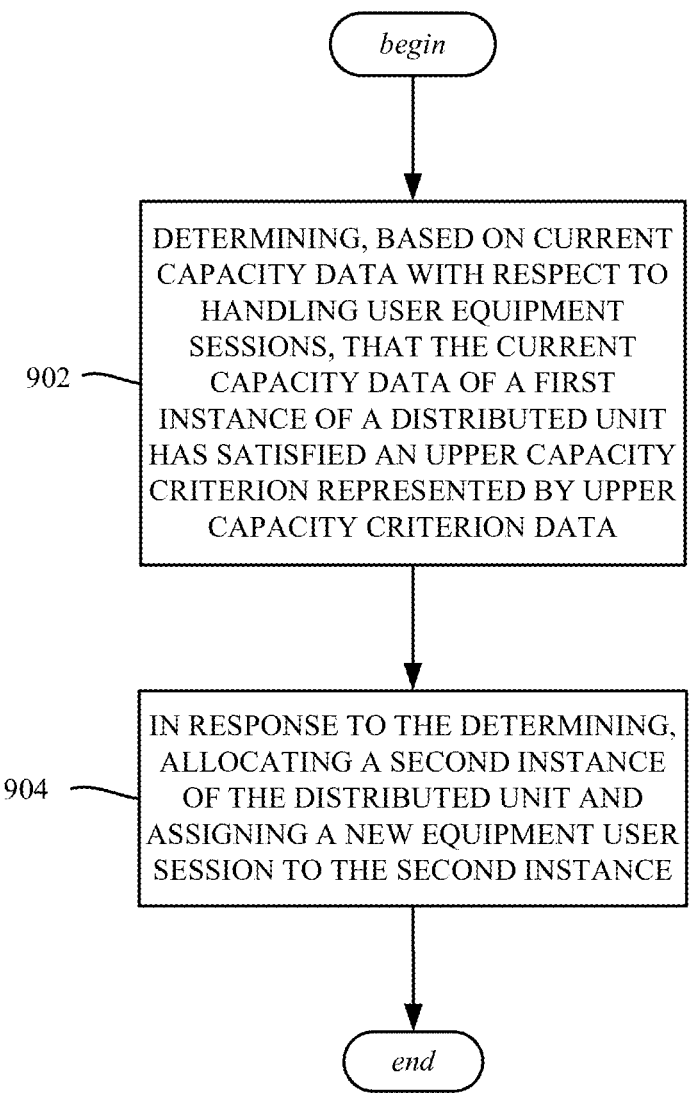
FIG. 9 illustrates example operations related to allocating a second instance of a distributed unit and assigning a new equipment user session to the second instance based on current capacity data of a first instance, in accordance with various aspects and embodiments of the subject disclosure.

One or more aspects are represented in FIG. 9, such as implemented in a machine-readable medium, comprising executable instructions that, when executed by a processor, facilitate performance of operations. Example operation 902 represents determining, based on current capacity data with respect to handling user equipment sessions, that the current capacity data of a first instance of a distributed unit has satisfied an upper capacity criterion represented by upper capacity criterion data. Example operation 904 represents, in response to the determining, allocating a second instance of the distributed unit and assigning a new equipment user session to the second instance.

Further operations can include determining, based on current capacity data representative of current capacities with respect to handling user equipment sessions, that a current capacity of the first instance of the distributed unit has satisfied a lower capacity criterion represented by lower capacity criterion data, and in response, deallocating the first instance of the distributed unit. The lower capacity criterion being satisfied can include an existing user session of the user equipment sessions that has exceeded a time limit, and further operations can include, prior to deallocating the first instance, migrating the existing user session to the second instance.

As can be seen, the technology described herein facilitates reduce resource usage, which among other benefits reducing power consumption during non-busy times. The technology described herein thus facilitates thin provisioning of resources, which simplifies maintenance and improves resiliency. The technology described herein further facilitates standard deployment units (server/baseband unit) instances across hubs.

Turning to aspects in general, a wireless communication system can employ various cellular systems, technologies, and modulation schemes to facilitate wireless radio communications between devices (e.g., a user equipment/UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 10:
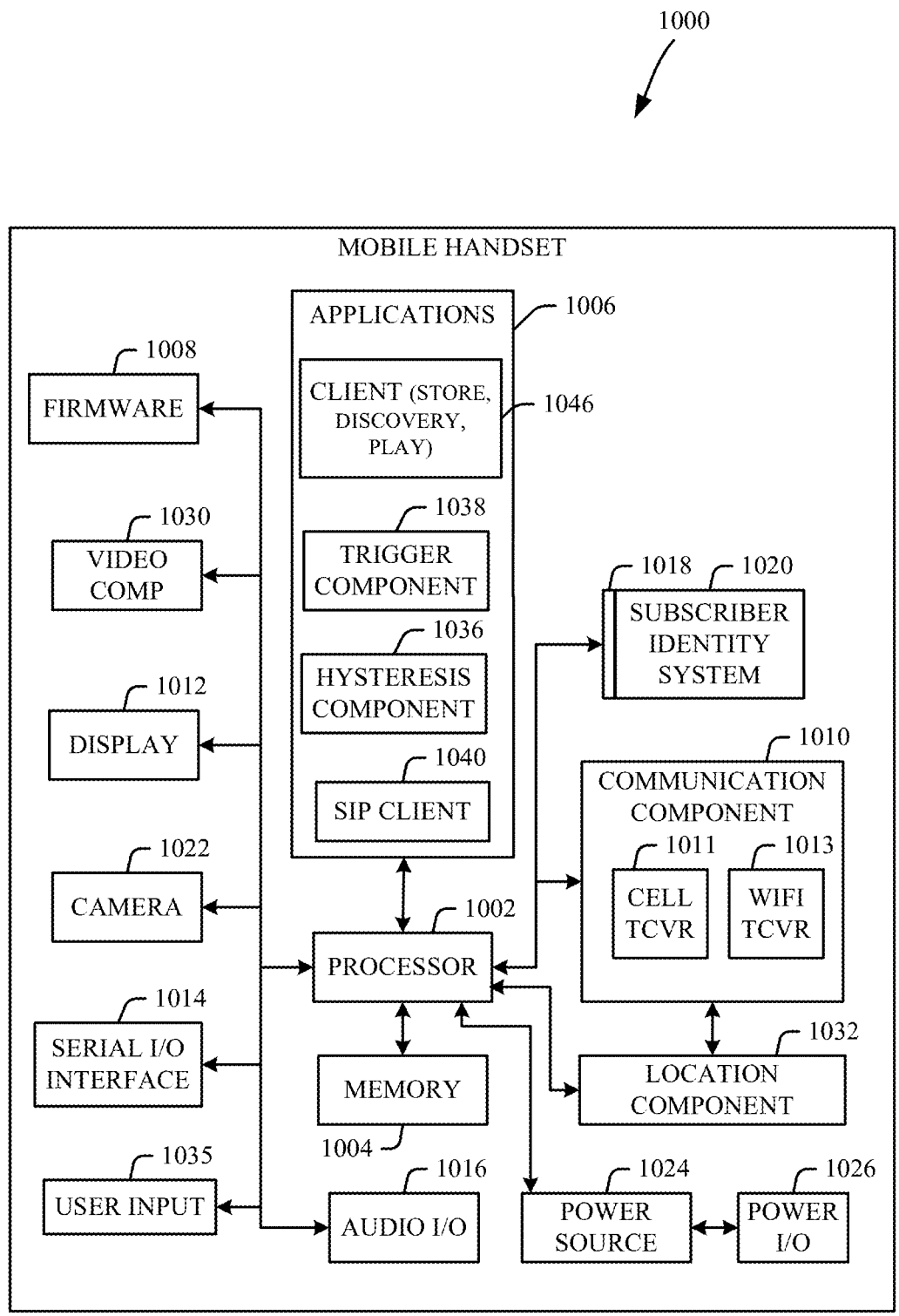
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device (such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
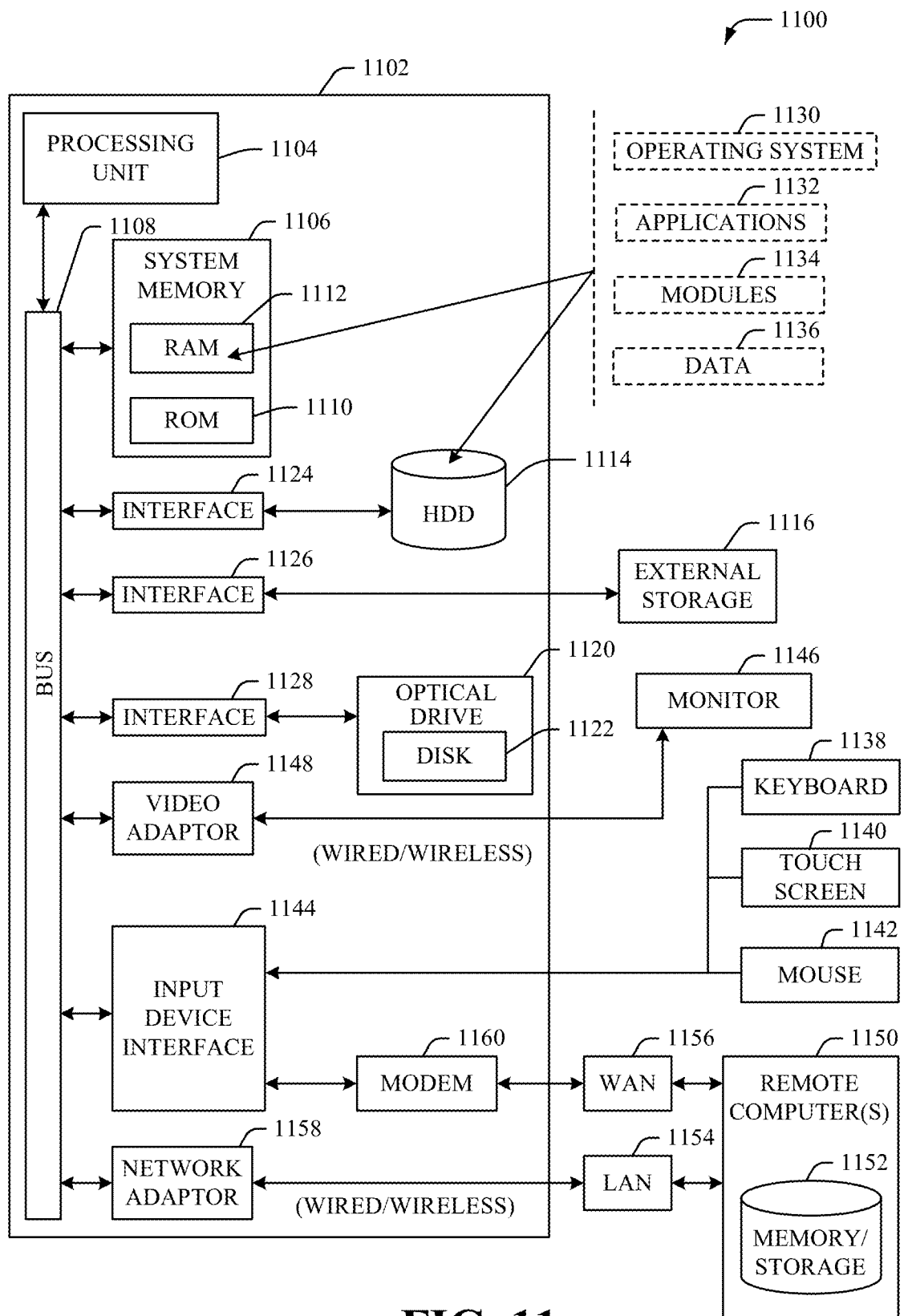
FIG. 11 illustrates an example block diagram of an example computer/machine system operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD), non-volatile memory and other storage technology could be used in addition to, or in place of, an HDD 1114, and can be internal or external. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally include emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can include one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or framebased flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
    a processor; and
    a memory that stores executable instructions that, when executed by the processor of the system, facilitate performance of operations, the operations comprising:
        determining, based on capacity data associated with first server resources, that the capacity data satisfies a defined upper capacity criterion with respect to communicating user equipment sessions; and
        in response to the determining:
            selecting a carrier from a group of carriers, resulting in a selected carrier;
            allocating second server resources for the selected carrier, and
            assigning an unassigned incoming user equipment session, other than the user equipment sessions and associated with the selected carrier, to the second server resources, the assigning resulting in the unassigned incoming user equipment session being an assigned incoming user equipment session,
    wherein the first server resources correspond to a baseband unit instance.

2. The system of claim 1, wherein the capacity data associated with the first server resources comprises first capacity data, wherein the selected carrier is a first selected carrier, wherein the unassigned incoming equipment user session is a first unassigned incoming equipment user session, and wherein the operations further comprise:
    determining, based on second capacity data associated with the second server resources, that the second capacity data satisfies a second defined upper capacity criterion with respect to communicating user equipment sessions via the second server resources,
    in response to the determining that the second capacity data satisfies the second defined upper capacity criterion, allocating third server resources for a second selected carrier of the group of carriers, and
    assigning a second unassigned incoming equipment user session associated with the third second selected carrier to the third server resources.

3. The system of claim 1, wherein the selected carrier of the group of carriers comprises a first selected carrier of a subgroup of the group of carriers, wherein the unassigned incoming equipment user session is a first new incoming equipment user session, and wherein the operations further comprise selecting a second selected carrier of the subgroup of the group of carriers, and assigning a second unassigned incoming equipment user session associated with the second selected carrier to the second server resources.

4. The system of claim 3, wherein the subgroup of the group of carriers corresponds to a single cell site.

5. The system of claim 1, wherein the operations further comprise determining that the first server resources are no longer communicating any of the user equipment sessions.

6. The system of claim 5, wherein the operations further comprise, in response to the determining that the first server resources are no longer communicating any of the user equipment sessions, deallocating the first server resources.

7. The system of claim 1, wherein the operations further comprise determining that the first server resources are communicating a number of remaining user equipment sessions of the user equipment sessions, and, in response to the determining that the first server resources are communicating the number of remaining user equipment sessions, migrating the number of remaining user equipment sessions to the second server resources, and deallocating the first server resources.

8. The system of claim 1, wherein the operations further comprise determining that the first server resources are communicating a remaining user equipment session of the user equipment sessions for a length of time that satisfies a defined length of time criterion, and, in response to the determining, migrating the remaining user equipment session to the second server resources, and deallocating the first server resources.

9. The system of claim 1, wherein selecting the selected carrier comprises at least one of: determining the selected carrier based on a least loaded cell that comprises the selected carrier, determining the selected carrier based on most loaded cell that comprises the selected carrier, determining the selected carrier based on a least number of existing user equipment sessions associated with the selected carrier or a greatest number of the existing user equipment sessions associated with the selected carrier, determining the selected carrier based on a random selection, or determining the selected carrier based on a round robin selection.

10. The system of claim 1, wherein allocating the second server resources for the selected carrier corresponds to a distributed unit instance assignment, and wherein the distributed unit instance assignment is performed by a centralized unit control plane function.

11. The system of claim 1, wherein allocating the second server resources for the selected carrier corresponds to a distributed unit instance assignment, and wherein the distributed unit instance assignment is performed by a function of an F1 interface application protocol handler coupled to a distributed unit.

12. The system of claim 1, wherein the group of carriers corresponds to a cell of a network.

13. The system of claim 1, wherein allocating the second server resources for the selected carrier corresponds to a distributed unit instance assignment of a distributed unit instance, and wherein the operations further comprise:
    recording an identifier of the distributed unit instance as part of a downlink transmission to the unassigned incoming user equipment session, receiving an uplink transmission from the unassigned incoming user equipment session, the uplink transmission comprising the identifier of the distributed unit instance, and directing the uplink transmission to the distributed unit instance based on the identifier of the distributed unit instance.

14. The system of claim 1, wherein the operations further comprise determining, prior to assigning the unassigned incoming equipment user session, that the second server resources have available capacity to handle the unassigned incoming user equipment session.

15. A method, comprising:

based on an estimated unavailable capacity by current servers to manage an additional user equipment session beyond current user equipment sessions managed by the current servers, and based on an estimated available capacity by an additional server, other than the currently managed servers, to manage additional user equipment sessions, allocating, by a system comprising a processor, the additional server to manage an additional user equipment session;

determining, by the system, that the additional server is ready to manage the additional user equipment session;

obtaining, by the system, the additional user equipment session;

assigning, by the system, the additional user equipment session to the additional server; and deallocating, by the system, a current server of the current servers that is no longer managing any of the current user equipment sessions.

16. The method of claim 15, wherein allocating the additional server comprises predicting the estimated unavailable capacity by the current servers based on historical load data.

17. The method of claim 15, wherein allocating the additional server based on the estimated available capacity by the additional server comprises determining that current server capacity of the current servers satisfies a defined capacity criterion.

18. A non-transitory machine-readable medium, comprising executable instructions that, when executed by a processor, facilitate performance of operations, the operations comprising:

determining, based on current capacity data with respect to handling user equipment sessions, that the current capacity data of a first instance of a distributed unit has satisfied an upper capacity criterion represented by upper capacity criterion data;

in response to the determining, allocating a second instance of the distributed unit and assigning a new equipment user session to the second instance; and determining, based on current capacity data representative of current capacities with respect to handling user equipment sessions, that a current capacity of the first instance of the distributed unit has satisfied a lower capacity criterion represented by lower capacity criterion data, and in response, deallocating the first instance of the distributed unit.

19. The non-transitory machine-readable medium of claim 18, wherein the lower capacity criterion being satisfied comprises an existing user session of the user equipment sessions that has exceeded a time limit.

20. The non-transitory machine-readable medium of claim 19, wherein the operations further comprise, prior to deallocating the first instance, migrating the existing user session to the second instance.

* * * * *